Patented Nov. 6, 1923.

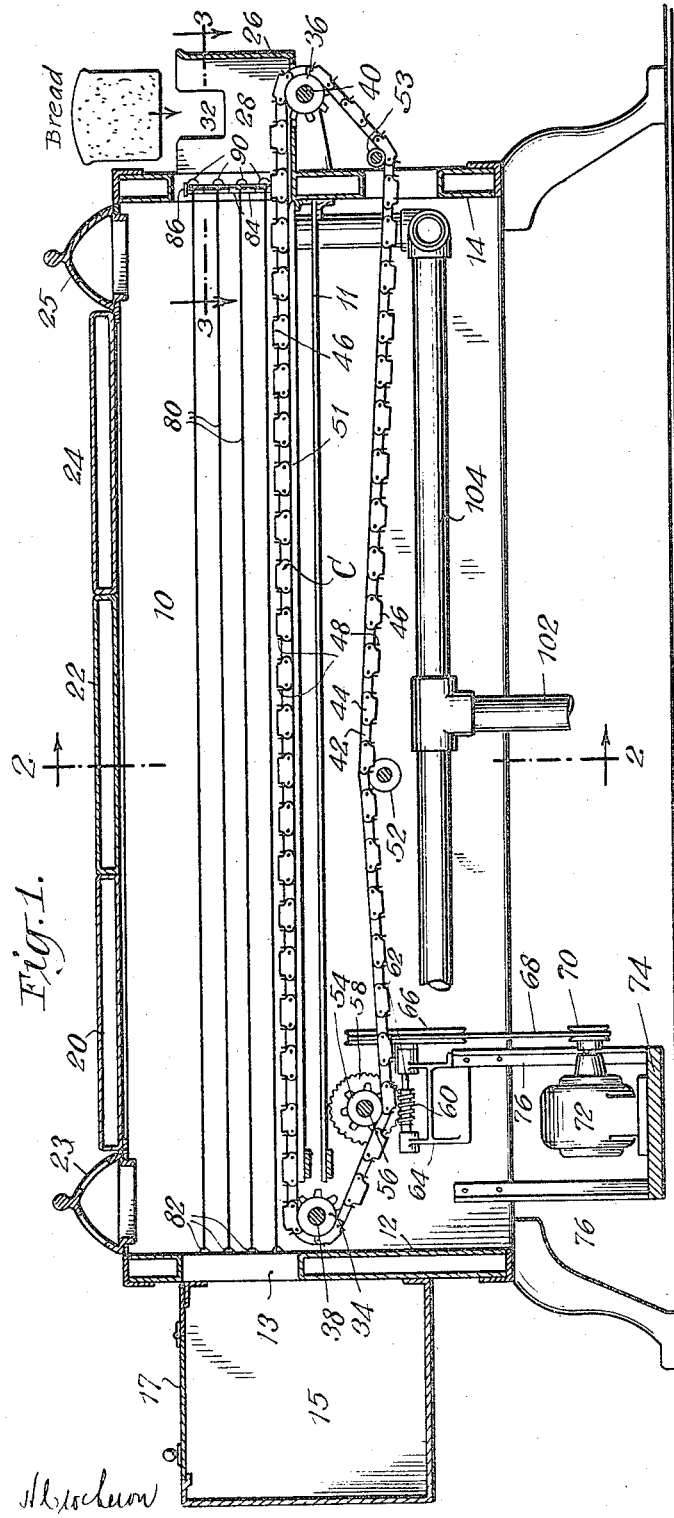

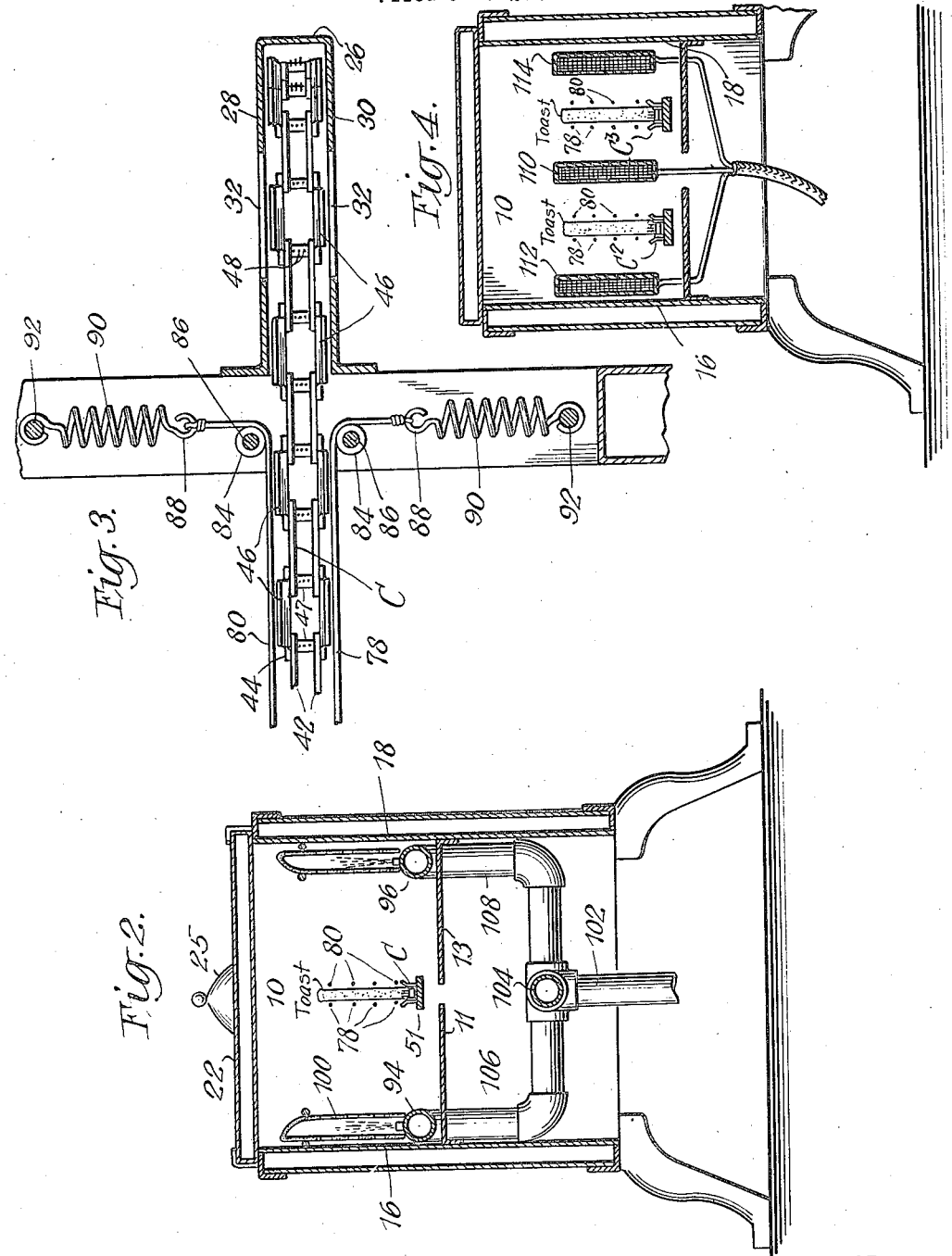

1,473,213

UNITED STATES PATENT OFFICE.

ALFREDO DE MATTEIS, OF NEW YORK, N. Y.

AUTOMATIC TOASTER.

Application filed June 27, 1922. Serial No. 571,313.

*To all whom it may concern:*

Be it known that I, ALFREDO DE MATTEIS, a citizen of the United States, and a resident of the borough of Manhattan, city, county, and State of New York, have invented certain new and useful Improvements in Automatic Toasters, of which the following is a specification.

This invention relates to kitchen devices and particularly to an improved device for rapidly toasting slices of bread in succession as they are fed to the device. The invention is of great utility in hotels and restaurants where either large or small quantities of toast are often required on short notice.

In general terms my improved toaster comprises a heating compartment provided with a carrier for moving the slices to be toasted therethrough. The device is provided with improved means for assisting the operator in positioning the slices on the carrier, and for guiding the slices in an upright position as they travel through the heating compartment. The guiding means for the slices to be toasted constitutes one of the important features of my invention and includes yielding elements arranged to compensate for expansion and contraction of the guides due to the heating action of the device. The carrier employed is of improved design and is formed with pins adapted to enter the slices to prevent them moving relatively thereto and means are also provided on the carrier to assist in positioning the slices on the carrier.

This application is filed as a continuation in part of my prior application Serial No. 448,458, filed February 28th, 1921.

The invention is fully described in the following specification and is exemplified in the accompanying drawings in which:

Fig. 1 is a longitudinal section through a preferred form of the device, the heating elements omitted.

Fig. 2 is a transverse section on line 2—2 of Fig. 1.

Fig. 3 is an enlarged horizontal section on line 3—3 of Fig. 1.

Fig. 4 is a transverse section showing an alternative form of the device.

Fig. 5 is an enlarged detail partly in elevation and partly in section of a portion of the carrier.

Fig. 6 is a section on line 6—6 of Fig. 5.

Referring to the drawings, the device includes a heating compartment 10 having end walls 12 and 14 and side walls 16 and 18 and bottom plates 11 and 13. These walls are of double formation, as shown, and may be provided with suitable heat insulation material. The top of the compartment is covered by plates 20, 22 and 24, which may serve as a hot table for keeping dishes or food hot. To the end wall 14 is secured a feed hopper 26 whose inside width in plan is a trifle greater than the thickest slice of bread to be toasted. The other inside dimensions correspond approximately to the size of a slice of bread. The side walls 28 and 30 of this hopper are cut away as at 32 to permit passage of the operator's fingers.

A carrier C is supported at one end on a sprocket 34 within the compartment 10 and at the opposite end on a similar sprocket 36 which projects through the bottom of the feed hopper. The sprockets 34 and 36 are carried by suitable shafts 38 and 40 as shown. The carrier C is in the form of a chain made up of links 42 and 44, the latter having flared lugs 46 formed thereon which are adapted to guide the slice on to the carrier as it is inserted in the feed hopper. The links 42 and 44 are connected by suitable shouldered rivets 47 and to each rivet is secured a transverse row of pins 48 having pointed ends 50 adapted to enter the slices of bread to prevent them from moving relatively to the carrier. A fixed bar 51 extends longitudinally of the compartment and serves as a support to prevent the loaded carrier chain from sagging.

The carrier chain is trained over idler rolls 52 and 53 and a drive sprocket 54 carried by a shaft 56. The shaft 56 carries on its end a worm-wheel 58 which meshes with a worm 60 on a shaft 62 mounted in bearings in a suitably supported bracket 64. The shaft 62 carries a pulley 66 which is driven by a belt 68 from the drive pulley 70 of the motor 72 which is supported on base 74 carried by hangers 76 secured to the walls of the heating compartment.

For guiding the slices of bread to be toasted I have provided wires 78 and 80 extending parallel to the center line of the carrier and located above it as shown in Figs. 1 and 3. These wires assist in holding the toast in an upright position as it travels through the compartment on the carrier C and positively prevents the slices from falling sidewise. Each of the wires is secured at one end to fixed anchorages as at 82 but at the other end they pass around rollers 84 on pins 86 and are secured to the eyes 88 of springs 90 which are anchored to fixed pins 92. This arrangement permits the springs to compensate for elongation or shrinkage of the guide wires or to keep them taut at all times. This is important for when the guide wires are fixed at both ends the heat of the device is sufficient to expand or elongate the wires sufficiently to cause them to sag and being hot they burnish or stick to the toast and interfere with the smooth operation of the device. The springs 90 exert sufficient tension on the wires to prevent their sagging and thus contribute greatly to the successful operation of the device.

The compartment 10 can be heated in various ways. In Figs. 1 and 2 I have shown a gas heater comprising opposed heating elements 94 and 96 having burner tips 98 over which are fitted known types of mantles 100 of incandescent media. The heating elements 94 and 96 are supplied with fuel from a central pipe 102 having a longitudinal main 104 and branches 106 and 108 connected thereto.

In Fig. 4 I have shown an alternative arrangement wherein the heating compartment 10 is provided with two carriers $C^2$ and $C^3$ a central electric heating element 110 being located between the carriers and other electric heaters 112 and 114 being located on opposite sides of the carriers as shown.

From the above description the operation of the device can be readily perceived. The operator turns a suitable switch to start the motor and then successively inserts slices of bread in the hopper 26 and presses each slice slightly to engage it with the pins 48 on the carrier. The flared lugs 46 on the links of the carrier assist in positioning the slice thereon. The slices are then rapidly carried through the heating compartment between the opposed heating elements, the guide wires 78 and 80 serving to hold them in an upright position so that they are evenly toasted on both sides. When a slice reaches the end of the compartment 10 near the wall 12 it is freed from the carrier as the chain travels around the sprocket 34 and the thoroughly toasted slices drop successively through the opening 13 into a delivery hopper 15. This hopper is provided with a hinged cover 17 adapted to retain the heat in the hopper yet permit the ready removal of the toast by the waiters as required. Access may be had to the interior of the compartment by removing the plates 20, 22 and 24, or the vent lids 23 and 25 may be lifted to inspect the interior when desired.

Though I have described in minute detail the embodiments of the invention herein illustrated it is not to be construed that I am limited thereto, as changes in arrangement and substitution of equivalents may be made without departing from the invention as defined in the appended claims.

Having thus described my invention what I claim as new and desire to secure by Letters Patent is:

1. In a device for toasting bread, opposed heating elements, means for moving the slices of bread to be toasted between said heating elements, and stationary means for guiding the slices of bread as they travel between said heating elements.

2. In a device for toasting bread, opposed heating elements, means for moving the slices of bread to be toasted between said heating elements, wires adapted to guide the slices of bread as they travel past said heating elements and means for compensating for elongation or shrinkage of said wires.

3. In a device for toasting bread, opposed heating elements, a chain carrier movable in juxtaposition to said heating elements, pins for positioning the slices of bread on said carrier, wires for guiding the slices as they travel past said heating elements, and means for keeping said wires taut.

4. In a device for toasting bread, a heating element, a chain carrier for moving the slices of bread past said heating element, said carrier having pins adapted to enter the slices and links having lugs adapted to guide the slices onto said pins when they are placed on the carrier.

5. A device for toasting bread including in combination, a heating compartment, a feed hopper, a delivery hopper, a carrier for moving the slices to be toasted from said feed hopper in upright position to said delivery hopper through heating compartment.

6. A device for toasting bread including in combination, a heating compartment, a feed hopper, a delivery hopper, a carrier for moving the slices to be toasted in upright position from said feed hopper to said delivery hopper through heating compartment with their sides freely exposed to heat radiated in said heating compartment, and means for guiding the slices as they travel through the heating compartment.

7. A device for toasting bread including in combination, a heating compartment, a carrier for moving slices of bread in upright position through said heating compartment, a feed hopper open at the top to receive the slices to be toasted in an upright position and guide them onto the carrier.

8. A device for toasting bread including in combination, a heating compartment, a carrier for moving slices of bread through said heating compartment, a feed hopper open at the top to receive the slices to be toasted in an upright position and guide them onto the carrier, and means independent of said carrier for holding the slices in an upright position as they travel through said compartment.

9. In a device of the class described, a chain carrier for moving slices of bread through a heating compartment comprising a series of links having pins adapted to enter the slices to prevent them from moving relatively to the carrier and having guide lugs to assist in positioning the slices on said pins.

10. A device for toasting bread including in combination a heating compartment, a carrier for moving slices of bread through said compartment, a feed hopper for positioning the slices in an upright position on said carrier, guide wires for preventing the slices falling sidewise as they travel through said compartment and means for keeping said wires taut.

11. A device for toasting bread including in combination a heating compartment, a carrier for moving slices of bread through said compartment, stationary means for guiding the slices vertically so as to position them in an upright position on the carrier and means for holding the slices upright as they travel through the heating compartment.

12. A device for toasting bread including in combination a compartment having a pair of opposed heating elements therein, a carrier movable between said heating elements, guide wires located in parallel planes on opposite sides of the center of said carrier adapted to hold the slices upright as they travel between said heating elements, and yielding means secured to one end of each of said wires to compensate for elongation or shrinkage thereof.

13. A device for toasting bread comprising a compartment having opposed heating elements therein, a chain carrier having pins for preventing movement of the slices of bread relatively thereto, a motor for driving said carrier, a feed hopper for guiding the slices vertically onto said carrier, wires for preventing the slices from falling sidewise as they travel past the heating elements and a delivery hopper into which the toasted slices are discharged by said carrier.

14. In a machine of the character described, upright heaters, a chain driven therebetween, means on the chain to carry slices of bread upright between the heaters, and means to supply and guide bread to said chain.

15. A machine of the kind described which comprises upright heaters, means therebetween adapted to carry slices of bread upright between said heaters and guide wires disposed at both sides of said means and extending in position to hold bread slices in upright position.

16. A machine of the kind described which comprises upright heaters, means therebetween adapted to carry slices of bread upright between said heaters, means to deliver slices to the toaster and means for receiving slices therefrom.

17. A machine of the kind described which comprises, upright heaters, a chain therebetween adapted to carry slices of bread upright between said heaters and horizontal guide wires disposed at both sides of said chain and extending in position to hold bread slices in upright position.

18. Apparatus of the type described which comprises, a chamber having an endless chain extending therethrough in a vertical plane, said chain projecting through one end of said chamber, a vertically arranged feed hopper above the projecting end of said chain, heat radiating elements at either side of said chain, guide means above and at either side of said chain, and a receiving chamber at the opposite end of said chain.

19. Apparatus of the type described which comprises, a chamber having an endless chain extending therethrough in a vertical plane, said chain projecting through one end of said chamber, a vertically arranged feed hopper above the projecting end of said chain, heat radiating elements at either side of said chain, means on said chain for engaging the lower edge of a slice of bread in vertical position and a vertical series of horizontal guide wires at each side of said chain between the path of said slice and said heat radiating elements.

20. Apparatus of the type described which comprises, a chamber having an endless chain extending therethrough in a vertical plane, said chain projecting through one end of said chamber, a charging hopper above the projecting end of said chain having spaced vertical walls and cut away portions in the upper part of said walls, heat radiating elements at either side of said chain, a receiving hopper at the discharge end of said chain, and means for engaging the lower edge of a slice of bread on said chain and for disengaging said slice as it reaches the discharge end of said chain.

21. Apparatus of the type described which comprises an endless chain having a horizontal lap, a series of vertically positioned horizontal guide wires on either side of said horizontal lap, heating elements on the outer sides of said guide wires, means for driving said chain in a continuous manner, a feed hopper at the starting end of said horizontal lap and a receiver at the opposite end of said lap.

22. Apparatus of the type described which comprises, an endless chain having a horizontal lap, a series of vertically projecting pins on said chain as it passes through said lap, a vertical series of horizontal guide wires on each side of said lap, heating elements at the outer sides of said wires, means for driving said chain in a continuous manner and a feed hopper at the starting end of said lap having a vertical guide channel immediately above said chain.

23. Apparatus of the type described which comprises, an endless chain having a horizontal lap and means for driving said chain in a continuous manner, a feed hopper having a vertical guide channel immediately above the starting end of said lap, upwardly projecting pins on the chain in said lap adapted to engage a slice of bread inserted through said channel, a receiving hopper into which said slices are discharged from the discharge end of said lap, heat radiating elements on either side of said lap, a vertical series of horizontal guide wires on either side of said lap between said heat radiating elements and said chain and tensioning means for said guide wires.

In witness whereof, I have hereunto set my hand at the borough of Manhattan, city, county and State of New York, this 26th day of June, 1922.

ALFREDO DE MATTEIS.